US012786890B2

(12) United States Patent
Ji et al.

(10) Patent No.: US 12,786,890 B2
(45) Date of Patent: Nov. 3, 2026

(54) MULTI-AGENT DEEP REINFORCEMENT LEARNING-ENABLED DISTRIBUTED POWER ALLOCATION SCHEME FOR MMWAVE CELLULAR NETWORKS

(71) Applicant: University of Utah Research Foundation, Salt Lake City, UT (US)

(72) Inventors: Mingyue Ji, Sandy, UT (US); Sneha Kumar Kasera, Salt Lake City, UT (US); Xiang Zhang, Salt Lake City, UT (US); Arupjyoti Bhuyan, Idaho Falls, ID (US)

(73) Assignees: University of Utah Research Foundation, Salt Lake City, UT (US); Battelle Energy Alliance, LLC, Idaho Falls, ID (US)

( * ) Notice: Subject to any disclaimer, the term of this patent is extended or adjusted under 35 U.S.C. 154(b) by 227 days.

(21) Appl. No.: 18/675,835

(22) Filed: May 28, 2024

(65) Prior Publication Data

US 2024/0397435 A1 Nov. 28, 2024

Related U.S. Application Data

(60) Provisional application No. 63/504,467, filed on May 26, 2023.

(51) Int. Cl.
*H04W 52/22* (2009.01)
*G06N 3/092* (2023.01)
(Continued)

(52) U.S. Cl.
CPC .......... *H04W 52/226* (2013.01); *G06N 3/092* (2023.01); *H04W 52/243* (2013.01); *H04W 52/26* (2013.01)

(58) Field of Classification Search
CPC . H04W 52/26; H04W 52/226; H04W 52/243; G06N 3/092
See application file for complete search history.

(56) References Cited

U.S. PATENT DOCUMENTS 11,388,732 B2 7/2022 Sana et al.
11,494,649 B2 11/2022 Chen et al.
(Continued)

OTHER PUBLICATIONS

Ahmed. et al., "A deep Q-learning method for downlink power allocation in multi-cell networks," arXiv preprint arXiv, 2019, pp. 6.

(Continued)

*Primary Examiner* — Raymond S Dean
(74) *Attorney, Agent, or Firm* — Workman Nydegger

(57) ABSTRACT

A base station associated with user devices in a wireless network includes a plurality of base stations. The base station includes a processor and a memory including instructions that, when executed by the processor, cause the base station to function as an actor network configured to determine a current transmit power, a critic network configured to evaluate a quality function of previous transmit powers of the base station based on local observations and previous transmit powers of neighboring base stations, and a decentralized training unit configured to train the quality function over the neighboring base stations. The neighboring base stations are a subset of the plurality of base stations, and the current transmit power is determined based on the previous transmit powers of the base station, direct channel gains between the base station and the user devices, and interference measures from the user devices.

20 Claims, 9 Drawing Sheets

(51) Int. Cl.
*H04W 52/24* (2009.01)
*H04W 52/26* (2009.01)

(56) References Cited

U.S. PATENT DOCUMENTS

| | | | | |
|---|---|---|---|---|
| 11,522,593 | B1 | 12/2022 | Fan et al. | |
| 11,856,524 | B2 * | 12/2023 | El-Jamous | H04W 52/06 |
| 2022/0188623 | A1 * | 6/2022 | Price | G06N 3/08 |
| 2022/0264331 | A1 | 8/2022 | Arnott et al. | |
| 2022/0358364 | A1 * | 11/2022 | Allen | G06N 3/09 |
| 2022/0377614 | A1 * | 11/2022 | Balakrishnan | H04W 28/0268 |
| 2022/0398262 | A1 * | 12/2022 | Derakhshani | G06N 3/0499 |
| 2023/0231796 | A1 * | 7/2023 | Ren | H04W 40/10 370/392 |
| 2024/0088959 | A1 * | 3/2024 | Lee | G06N 3/092 |

OTHER PUBLICATIONS

Meng. et al, "Power Allocation in Multi-User Cellular Networks: Deep Reinforcement Learning Approaches," IEEE Transactions on Wireless Communications, vol. 19, Issue 10, 2020, pp. 6255-6267.
Nasir. et al., "Deep actor-critic learning for distributed power control in wireless mobile networks," 54th Asilomar Conference on Signals, Systems, and Computers. IEEE, 2020, pp. 5.
Nasir. et al., "Deep reinforcement learning for joint spectrum and power allocation in cellular networks," IEEE Globecom Workshops (GC Wkshps). IEEE, 2021, pp. 7.
Nasir. et al., "Multi-agent deep reinforcement learning for dynamic power allocation in wireless networks," IEEE Journal on Selected Areas in Communications, vol. 37, Issue 10, 2019, pp. 2239-2250.
Rosenberger. et al, "Deep reinforcement learning multi-agent system for resource allocation in industrial internet of things," Sensors, vol. 22, Issue 11, 2022, pp. 23.
Yang. et al., "Dynamic power allocation in cellular network based on multi-agent double deep reinforcement learning," Computer Networks, vol. 217, Nov. 9, 2022, 109342.

* cited by examiner

600

MULTI-AGENT DEEP REINFORCEMENT LEARNING-ENABLED DISTRIBUTED POWER ALLOCATION SCHEME FOR MMWAVE CELLULAR NETWORKS

CROSS-REFERENCE TO RELATED APPLICATIONS

This application claims the benefit of and priority to U.S. Provisional Patent Application Ser. No. 63/504,467 filed on May 26, 2023, and entitled "MULTI-AGENT DEEP REINFORCEMENT LEARNING-ENABLED DISTRIBUTED POWER ALLOCATION SCHEME FOR MMWAVE CELLULAR NETWORKS," which is expressly incorporated herein by reference in its entirety.

GOVERNMENT RIGHTS

This present disclosure was made with government support under DE-AC07-05ID14517 awarded by the U.S. Department of Energy, and 2229562 awarded by the National Science Foundation. The government has certain rights in the present disclosure.

FIELD

The present disclosure relates generally to systems, methods, and computer-readable media for allocating power for base stations in wireless network, and in particular, for allocating power using multi-agent deep reinforcement learning-enabled distributed scheme in wireless network.

BACKGROUND

Millimeter-Wave (mmWave) or wireless communication has been one important technology for the fifth-generation (5G) cellular systems. The proliferation of mmWave frequency bands has increased the link capacity by several orders of magnitude compared to sub-6 GHz wireless systems and is able to support massive connections. To combat propagation loss, directional beamforming is commonly used. It has been shown that even at mmWave frequencies, spectrum availability is still limited considering the abundance of mobile and data intensive services. Therefore, spectrum sharing is necessary for better utilization of unlicensed and shared spectrum.

The concurrency of highly directional transmissions, however, has presented new challenges to spectrum sharing. Without proper coordination, beams could overlap and cause severe interference which hinders the performance. The situation is further exacerbated by the use of small cells with densely populated user devices.

Recently, deep reinforcement learning (DRL) has achieved notable success in wireless resource management. A deep Q-network (DQN)-based (discrete) power allocation scheme, which achieves competitive throughput performance to conventional centralized approaches like weighted minimum mean square error (WMMSE) and fractional programming (FP), was proposed. Treating as RL agents, the transmitters improve their decision making by actively interacting with the radio environment and benefit from learning with accumulated experiences. This work was further extended to continuous power control and joint spectrum and power allocation.

Some other types of DRL algorithms were applied to the same tasks. For mmWave networks, a DQN-based resource management scheme was proposed to learn and predict blockage patterns in a backhaul capacity-limited system. A DQN-based joint spectrum and (discrete) power allocation scheme was proposed as well. The clustering problem for mm Wave networks with user mobility and proposed a DQN-based clustering scheme have been studied. Moreover, a deep recurrent Q-network (DRQN)-based handover scheme was proposed for dynamic mmWave user association. One common issue with these attempts is that the stationarity assumption of MDP is violated in the multi-agent setting as the environment seen by each agent is impacted by the unknown behaviors of other agents. This violation has been ignored in these studies.

BRIEF SUMMARY

In wireless communication system, sub-optimal solutions by solving a non-convex optimization lead to scalability issues due to centralized control. The present disclosure provides various aspects to address the scalability issues by using multi-agent deep reinforcement learning-enabled distributed scheme in wireless network.

In accordance with various aspect, a base station is associated with user devices in a wireless network, which includes a plurality of base stations. The base station includes a processor and a memory including instructions that, when executed by the processor, cause the base station to function as an actor network configured to determine a current transmit power, a critic network configured to evaluate a quality function of previous transmit powers of the base station based on local observations and previous transmit powers of neighboring base stations, and a decentralized training unit configured to train the quality function over the neighboring base stations. The neighboring base stations are a subset of the plurality of base stations, and the current transmit power is determined based on the previous transmit powers of the base station, direct channel gains between the base station and the user devices, and interference measures from the user devices.

In accordance with various aspects, a system is provided for allocating power in a wireless network. The system includes a plurality of base stations, of which each base station is configured to autonomously determine a transmit power based on local observations and being associated with user devices. Each base station includes a processor and a memory including instructions that, when executed by the processor, cause each base station to function as an actor network configured to determine a current transmit power, a critic network configured to evaluate a quality function of previous transmit powers of each base station based on local observations and previous transmit powers of neighboring base stations, and a decentralized training unit configured to train the quality function over the neighboring base stations. The neighboring base stations are a subset of the plurality of base stations, and the current transmit power is determined based on the previous transmit powers of the base station, direct channel gains between the base station and the user devices, and interference measures from the user devices.

In accordance with various aspects, a method is provided for allocating power to a plurality of base stations in a wireless network. The method includes receiving, at each base station associated with user devices, previous transmit powers of neighboring base stations, evaluating, at each base station, a quality function of previous transmit powers based on local observations and previous transmit powers of neighboring base stations, determining, at each base station, a current transmit power based on the previous transmit powers of each base station, direct channel gains between each base station and the user devices, and interference measures from the user devices, and training the quality function over the neighboring base stations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the present disclosure will be set forth in the description which follows, and in part will be obvious from the description, or may be learned by the practice of the teachings herein. The features and advantages of such implementations may be realized and obtained by means of the instruments and combinations particularly pointed out in the appended claims. These and other features of the present disclosure will become more fully apparent from the following description and appended claims, or may be learned by the practice of these implementations as set forth hereinafter.

BRIEF DESCRIPTION OF THE DRAWINGS

In order to describe the manner in which at least some of the advantages and features of the present disclosure may be obtained, a more particular description of aspects of the present disclosure will be rendered by reference to specific aspects thereof which are illustrated in the appended drawings. Understanding that these drawings depict only typical aspects of the present disclosure and are not therefore to be considered to be limiting of its scope in terms of dimensions, materials, configurations, arrangements or proportions unless otherwise limited by the claims, aspects of the present disclosure will be described and explained with additional specificity and detail through the use of the accompanying drawings described below.

DETAILED DESCRIPTION

Figure 1:
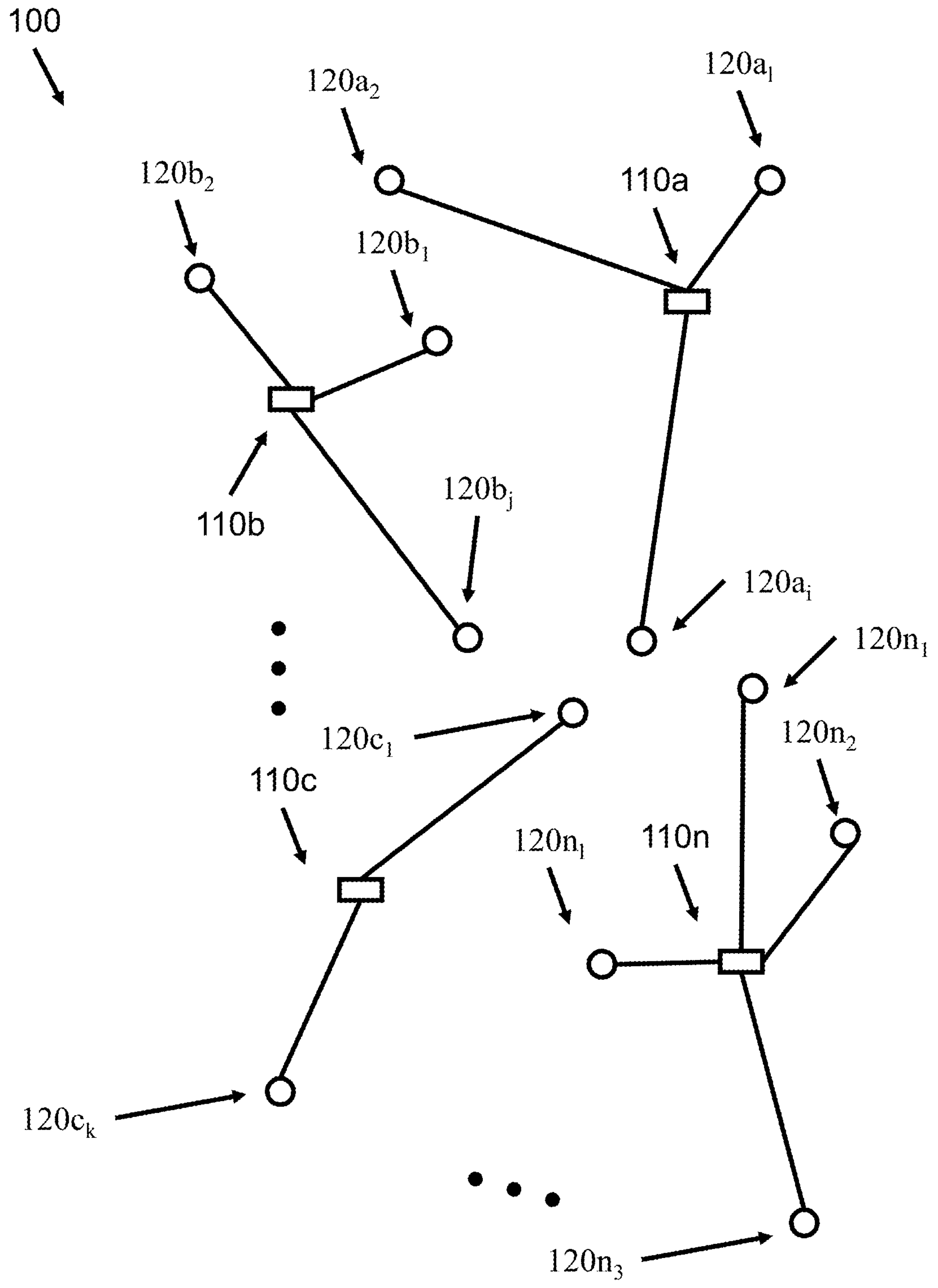
FIG. 1 is a block diagram illustrating a wireless communication network in accordance with various aspects of the present disclosure.

While these various aspects are described in sufficient detail to enable those skilled in the art to practice the present disclosure, it should be understood that other aspects may be realized and that various changes to the present disclosure may be made without departing from the spirit and scope of the present disclosure. Thus, the following more detailed description of the aspects of the present aspects is not intended to limit the scope of the present disclosure, as claimed, but is presented for purposes of illustration only and not limitation to describe the features and characteristics of the present disclosure, to set forth the best mode of operation of the present disclosure, and to sufficiently enable one skilled in the art to practice the present disclosure. Accordingly, the scope of the present disclosure is to be defined solely by the appended claims.

It is noted that aspects of the present disclosure, whether claimed or not, cannot be performed, practically or otherwise, in the mind of a human. Accordingly, nothing herein should be construed as teaching or suggesting that any aspects of the present disclosure could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

Power allocation schemes may be designed for wireless communication networks including millimeter waver (mmWave) cellular downlink by leveraging the multiagent deep deterministic policy gradient (MADDPG) algorithm. Each base station may be modeled as an agent that determines its transmit power autonomously in real time. MADDPG addresses the multi-agent environment non-stationarity issue by conditioning Q-functions of individual agents also on other agents' actions which may be made available by using a centralized-training-distributed-execution framework. Conditioning the Q-functions over actions of a large number of agents can result in high inter-base station communication overhead and may incur instability in training the agents.

To make it scalable, a distributed version of MADDPG may be employed where the Q-function (e.g., critic network) of each agent may be trained over a subset of base stations (i.e., each base station and its neighboring base stations) with a system-level reward. This formulation can suppress unnecessary information exchanges among base stations, which barely impact each other's local environment dynamics. It also increases the stability and training efficiency of the deep neural network (DNN)-based actor/critic training by restricting the input of the DNNs to a relatively small or manageable size. A distributed power allocation scheme will be described below based on the distributed MADDPG algorithm. Simulations can show that the employed scheme can achieve performance comparable or better than the conventional WMMSE and FP.

First, this scheme may deal with continuous power control while the DQN-based schemes can only handle discrete powers and the effect of quantization has not been properly investigated. Second, agent heterogeneity may be addressed by equipping each base station with a unique actor/critic network that accommodates its specific local radio environment. In contrast, in other approaches, a single global actor is trained using experiences gathered from all base stations which is then copied to each base station for use. For heterogeneous systems like mmWave networks where each base station can face quite different beam coverage and interference conditions, a single actor/critic may not be able to fit all agents. Third, the distributed MADDPG uses information exchange among subsets of base stations. This largely reduces the communication overhead compared to other alternatives where network-level experience collection is required.

Definitions

In describing and claiming the present disclosure, the following terminology will be used. The singular forms "a," "an," and "the" include plural referents unless the context clearly dictates otherwise. Thus, for example, reference to "a base station" includes reference to one or more of such materials and reference to "the base station" refers to one or more of such base stations.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" or "neighboring" refers to the proximity of two structures or elements. Particularly, elements that are identified as being "adjacent" or "neighboring" may be either abutting or connected. Such elements may also be near or close to each other without necessarily contacting each other. The exact degree of proximity may in some cases depend on the specific context.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the present disclosure should be determined solely by the appended claims and their legal equivalents, rather than by the descriptions and examples given herein.

Now turning to FIG. 1, illustrated is a wireless communication network 100 in accordance with various aspects of the present disclosure. The wireless communication network 100 may include a plurality of base stations 110*a*-110*n* and user devices 120$a_1$-120$n_1$. The base stations 110*a*-110*n* are associated with the user devices 120$a_1$-120$n_1$. In other words, the base stations 110*a*-110*n* may transmit or relay communication signals to or between the user devices 120$a_1$-120$n_1$. Any numerals (e.g., 110 and 120) without alphanumerical indexes (e.g., a, b, . . . , n, $b_1$, . . . , $n_1$, etc.) may refer to an individual element or a group of such individual elements. For example, the base station 110 may refer to an individual base station or the whole group of base stations collectively, and the user device 120 may refer to an individual user device or a whole group of user devices collectively.

The base station 110*a* transmits or relays communication signals to or between the user devices 120$a_1$-120$a_i$, where the subscript index "i" may be any number greater than or equal to one. Likewise, the base station 110*n* transmits or relays communication signals to or between the user devices 120$n_1$-120$n_1$, where the subscript index "1" may be any number greater than or equal to one.

The base stations 110 may include one or more antennas to enable beam-based directional transmissions while the user devices 120 may be equipped with a single antenna. In an aspect, the user devices 120 may be equipped with more than one antennas. The wireless communication network 100 may be a fully synchronized and slotted system operating on a shared spectrum of W Hz. The range of W Hz may be in a giga Hz range, tera Hz range, or any range greater than the tera Hz range. A block fading model may be adopted for downlink channels. In particular, the small-scale fading may keep unchanged during each slot and follow a temporally correlated Nakagami distribution with the following probability density:

$$f(x \mid m, \Omega) = \frac{2m^m}{\Gamma(m)\Omega^m} 2^{2m-1} e^{-\frac{m}{\Omega}x^2}, \forall x \geq 0, \tag{1}$$

with parameters $$\Omega = E[X^2],$$

$$m = \frac{\Omega^2}{\mathrm{Var}(X^2)}$$

and Γ denotes the Gamma function. The notation "∀" followed by a variable (e.g., x, t, or any other variable) represents the expression of for all values of the variable. The fading coefficients $\{h^{(t)}, \forall t\}$ are generated in a way such that, first, $h^{(t)}$, ∀t follows a Nakagami distribution with the same parameters m and Ω, and, second, the squared channels between any two consecutive time slots have a correlation coefficient ρ of $$\rho = \frac{\mathrm{cov}(|h^{(t)}|^2, |h^{(t+1)}|^2)}{\sqrt{\mathrm{VAR}(|h^{(t)}|^2)\mathrm{VAR}(|h^{(t+1)}|^2)}}, \forall t. \quad (2)$$

It is noted that $$h_{u_{ji}}^{(t)}$$

denotes the fading coefficient from the base station 110*i* to user device $u_j$ which is a scheduled user device of base station 110*i*. Since the j-th user device $u_j$ is not considered to be scheduled in this work, $$h_{u_{ji}}^{(t)}$$

may be written as $$h_{ji}^{(t)}$$

for brevity. The equivalent channel gain $$g_{ji}^{(t)}$$

may be expressed as $$g_{ji}^{(t)} = PL(d_{ji})G_{ji}|h_{ji}^{(t)}|^2, \quad (3)$$

in which $PL(d_{ji})$ indicates the path loss between the base station 110*i* and user device 120*$i_j$* or $u_j$ and $d_{ji}$ is the distance between the base station 110*i* and user device 120*$i_j$*, $G_{ji}$ indicates the antenna gain of base station 110*i* towards user device 120*$i_j$*. The dual-slope path loss model may be adopted for the wireless communication channel modeling. In particular, the path loss at distance d is equal to $$PL(d_{ji}) = \begin{cases} \frac{1}{d^{\alpha 0}}, fd \le d_C \\ \frac{d_C^{\alpha 1 - \alpha 0}}{d^{\alpha 1}}, d > d_C \end{cases}, \quad (4)$$

where $d_C$ is a critical distance indicating the boundary distance between the near-field and the far-field, and $\alpha_0$, $\alpha_1(\alpha_1 \ge \alpha_0 > 0)$ are path loss exponents for the near-field and the far-field, respectively. Moreover, the base stations 110 may use a keyhole-like sectorized antenna model which has a constant main lobe radiation gain of $G^{max}$ and a constant sidelobe gain $G^{min}$. In particular, the antenna gain in the direction of angle θ is equal to $G^{max}$if $|\theta| \le \Delta$ and $G^{min}$ otherwise, where Δ is the beamwidth. The main-to-sidelobe ratio (MSR) can be defined as $$MSR \triangleq 10\log\left(\frac{G^{max}}{G^{min}}\right)\mathrm{dB}. \quad (5)$$

When the power allocation profile of all base stations 110 at time t is $$MSR \triangleq [p_1^{(t)}, p_2^{(t)}, \ldots, p_n^{(t)}],$$

the received signal-to-interference-plus-noise ratio (SINR) at the scheduled user device 120*$i_j$* of the base station 110*i* is equal to $$SINR_i^{(t)} = \frac{g_{ii}^{(t)} p_i^{(t)}}{\sum_{j \ne i} g_{ij}^{(t)} p_j^{(t)} + \sigma^2}, \quad (6),$$

where $\sigma^2 = n_0 W$ is the total noise with $n_0$ denoting the noise power spectrum density. The normalized throughput (bps/Hz) of the base station 110*i* can be written in expression $$C_i^{(t)} = \log_2(1 + SINR_i^{(t)}). \quad (7)$$

The goal of the base station 110 is to maximize the total throughput therefrom, which is expressed as:

$$C_{sum}^{(t)} = \sum_i C_i^{(t)}, \forall t, \quad (8)$$

which is subject to instantaneous power constraints $$p_i^{(t)} \le p_i^{max}, \forall i.$$

In particular, a power allocation $$p_i^{(t)}$$

may be computed at the beginning of each time slot such that $$C_{sum}^{(t)}$$

may be maximized.

Although the power maximization problem has been extensively studied, finding the optimal solution is still challenging due to its non-convex nature. For wireless communication networks including millimeter wave (mmWave) networks, power control becomes more complicated as the beam-based transmissions by the base stations 110 may be properly coordinated to reduce interference. Unlike conventional approaches using centralized control, data-driven learning approaches may be leveraged to design distributed and scalable power allocation schemes, in which the base stations 110 choose powers based on their local measurements and limited information exchange with other neighboring base stations 110.

The multi-agent DRL-based power allocation is now described. A distributed version of MADDPG is derived based on which a power allocation scheme is then developed. An overview of DRL is provided first before proceeding to the description of the multi-agent DRL-based power allocation.

In reinforcement learning (RL), an agent aims to optimize an expected return through repeated interactions with the environment over time. In each interaction, the agent receives a reward signal from the environment as an indicator of the quality of the action taken. The agent learns in a trial-and-error manner by gradually refining its decision making using the received reward signals. Specifically, in a discrete-time Markov Decision Process (MDP) (S, A, R, T), given some state $s_t \in S$ at time t, the agent takes an action $a_t \in A$ with probability $\mu(a_t|s_t)$ according to a policy μ satisfying $\int_a \mu(a_t|s_t)da=1$, where $\mu(a_t|s_t)$ is a conditional probability of $a_t$ in the presence or condition of $s_t$. Impacted by $a_t$, the environment transitions (governed by the transition function T) to a new state $s_{t+1}$ and the agent receives a scalar reward $r_t=R(s_t, a_t, s_{t+1})$, which indicates how good the taken action $a_t$ is. The set of transition quadruples $\{(s_t, a_t, r_t, s_{t+1}), \forall t\}$ is referred to as an experience.

The return $G_t$ is defined as the cumulative future rewards, i.e., $$G_t \triangleq \sum_{\tau=0}^{\infty} \gamma^{\tau} r_{t+\tau}$$

with $\gamma \in (0, 1]$ being the discount factor that adjusts the relative importance of the near and far future rewards. The state-action value function (or Q-function) $Q^{\mu}$ under a specific policy μ is defined as the expected return starting from any state-action pair $(s, a) \in S \times A$, i.e., $$Q^{\mu}(s, a) \triangleq E[G_t \mid s_t = s, a_t = a], \tag{9}$$

where the expectation is taken over both the policy μ and the transition dynamics T. Model-free RL optimizes the agent's expected return without knowing or explicitly learning the transition dynamics and has seen significant developments in recent years due to the use of neural function approximators.

Deep Deterministic Policy Gradient (DDPG) is a DRL algorithm which focuses on deterministic policies that map each state s to a specific action $a=\mu(s)$. It uses an actor-critic architecture in which two separate DNNs $\theta^{\mu}$ and $\theta Q$ are used to represent the policy $\mu(s|\theta^{\mu})$, which is called an actor network, and the Q-function $Q(s, a|\theta Q)$, which is called a critic network, respectively. DDPG may be extended to the multi-agent domain and the multi-agent DDPG (MADDPG) algorithm, which addresses the non-stationarity issue due to multi-agent participation by conditioning the Q-function of each agent and the actions of other agents (referred to as a centralized critic network), i.e., agent or the base station **110*i*** may be defined with a Q-function $Q(s, a_1, \ldots, a_N)$ that has all agents' or base stations' actions as input. The intuition behind this modification is that, given a set of fixed actions of all other agents, the environment perceived by each agent becomes stationary regardless of what policies are used by other agents. Hereinafter, the term "agent" or "agents" may be interchangeably used as "base station" or "base stations," respectively.

Under the multi-agent setting, the i-th agent gets a local observation $o_i$ instead of the true global state. In this regard, turning to FIG. 2, the base station 200 may include an actor network 210, a critic network 220, a replay memory 230, a centralized training module 240, and a distributed execution module 250. The base station 200 may be any base station 110 of FIG. 1 and treated as a DRL agent, the actor network 210 may determine transmit powers, and the critic network 220 may evaluate Q-functions. It is noted that base stations 200 do not know each other's transmit powers, but can obtain interference measurements through feedback from the scheduled user devices as well as some additional measurements through information exchange with neighboring base stations.

The replay memory 230 may store local observations, which are a set of input data received by the base station 200, including previous power levels, channel gains, interference measurements, and throughput data from neighboring base stations. The centralized training module 240 may train the Q-functions of the critic networks 220 using data from the neighboring base stations. The distributed execution module 250 may enable each base station to autonomously determine and execute its transmit power based on local observations and the trained actor network 210. This distributed execution module 250 may ensure that the decision-making process is distributed across the network, allowing each base station to operate independently while still maintaining overall network performance. Further details of each component of the base station 200 are described below.

Actions may be chosen based on each agent's local observation, i.e., $$a_i = \mu_i(o_i|\theta_i^{\mu}).$$

The training of the centralized critic $$Q_i(s, a|\theta_i^{Q})$$

requires the knowledge of the global state $$s \triangleq (o_i)_{i=1}^{K}$$

and the joint actions $$a \triangleq (a_i)_{i=1}^{K}.$$

This may be enabled by the centralized training module 240, in which the actor network 210 and the critic network 220 may be trained periodically with network-level experiences, while the actions are determined based solely or partially on each agent's local observation. In an aspect, the replay memory 230 may use a fixed-size experience replay buffer D to store the past experiences collected from all agents in a first-in-first-out (FIFO) manner. Mini-batches of experiences are then sampled from the experience replay buffer D to train the actor network 210 and the critic network 220 using the stochastic gradient descent (SGD) method. More specifically, given a mini-batch B={($s^j$, $a^j$, $r^j$, $s'^j$)}, with $$r^j = \left(r_i^j\right)_{i=1}^{K}$$

being the rewards of all agents, the critic network 220 of the base station 200 or the agent may be trained by minimizing the following loss L:

$$L\left(\theta_i^Q\right) = \frac{1}{|B|}\sum_{j\in\{1,2,\ldots,B\}}\left(y_i^j - Q_i\left(s^j, \left(a_k^j\right)_{k=1}^{K} \,\middle|\, \theta_i^Q\right)\right)^2. \tag{10}$$

The regression target over the j-th sample in B can be expressed as the following:

$$y_i^j = r_i^j + Q_i'\left(s'^j, (a_k')_{k=1}^{K} \,\middle|\, \theta_i^{Q'}\right)\Big|_{a_k'=\mu_k'\left(o_k'^j \middle| \theta_k^{\mu'}\right)}, \forall k, \tag{11}$$

which is generated by two target networks $$Q_i'\left(\cdot \,\middle|\, \theta_i^{Q'}\right)$$

and $$\mu_k'\left(\cdot \,\middle|\, \theta_k^{\mu'}\right)$$

in order to stabilize the training process. The actor network 210 of the i-th agent may be trained by minimizing the following expression:

$$L\left(\theta_i^Q\right) = \frac{1}{|B|}\sum_{j\in\{1,2,\ldots,B\}} Q_i\left(s^j, \left(a_k^j\right)_{k\neq i}, a_i \,\middle|\, \theta_i^Q\right)\Big|_{a_i=\mu_i\left(o_i^j \middle| \theta_i^{\mu}\right)}. \tag{12}$$

Finally, the weights of the actor and critic networks 210 and 220 may be updated according to the following expression:

$$\theta_i^{Q'} \leftarrow \tau\theta^Q + (1-\tau)\theta_i^{Q'}, \theta_i^{\mu'} \leftarrow \tau\theta^{\mu} + (1-\tau)\theta_i^{\mu'}, \forall i \tag{13}$$

for some small number $\tau \in (0, 1)$. In MADDPG, exploration may be achieved by adding a random noise $N_t$ to the actor output, as follows:

$$a_i^{(t)} = \mu_i\left(o_i^{(t)} \,\middle|\, \theta_i^{(t)}\right) + N_t. \tag{14}$$

Figure 3:
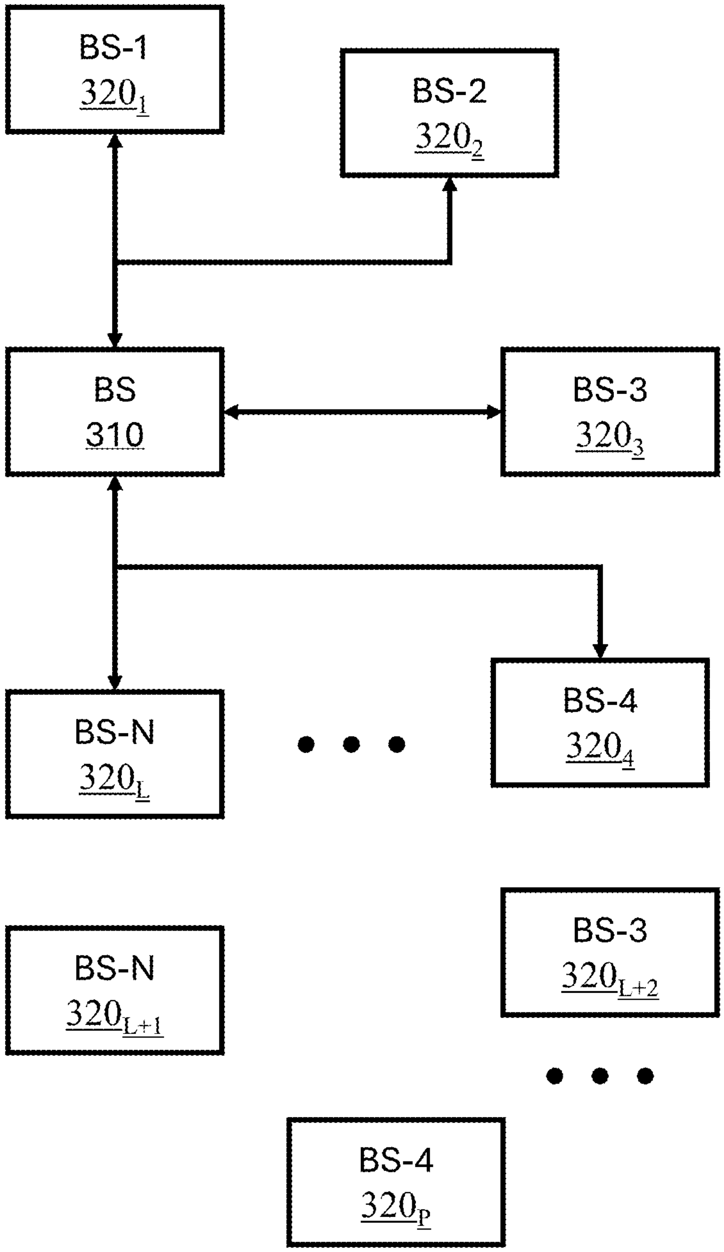
FIG. 3 is a block diagram of multi-agent deep deterministic policy gradient (MADDPG) with a distributed multiple-agent setting in accordance with various aspects of the present disclosure.

One drawback of the original MADDPG algorithm is that the Q-function $Q_i$(s, a) of each agent takes a global state $$s = (o_i)_{i=1}^{K}$$

and a joint action $$a = (a_i)_{i=1}^{K}$$

as inputs. This can be problematic for systems because wireless communication systems generally have a large number of base stations and the input dimension of the corresponding critic networks can be huge which may result in slow convergence and instability in DNN training. To address this issue according to the present disclosure, MADDPG may be modified to a distributed version of MADDPG, which allows decentralized critic training. In other words, the critic networks 220 of agents may be trained over a subset of all base stations. For example, as illustrated in FIG. 3, a base station 300 may be trained over a subset, 310$_1$-320$_L$, of all base stations 320$_1$-320$_P$. In particular, the training of the i-th agent is restricted to within its neighboring set $N_i \subseteq \{1, \ldots, K\}$, which is defined as a set of agents whose actions have significant impact on the i-th agent's local environment. In other words, the neighboring agents may be determined based on the directionality of the signals transmitted by the agent and the distance from the agent.

The i-th agent may receive a localized critic defined by the following expression:

$$Q_i\left((o_j)_{j\in\hat{N}_i}, (a_j)_{j\in\hat{N}_i} \,\middle|\, \theta_i^Q\right), \tag{15),}$$

where $\hat{N}_t \triangleq N_i \upsilon \{i\}$. $\hat{\ }_i$ and $\mu_i$ may be trained similarly according to expressions (10) and (12). Expression (15) may indicate that each agent only needs to gather information from its neighboring agents and network level information exchange (which introduces delays) can be reduced.

The definition of localized critic (15) may be motivated by the following observation. For example, in mmWave or wireless networks, base stations that are far apart from each other or with properly placed beams may contribute little interference to each other and have negligible impact on the local environment transition dynamics of each other. This is because mmWave frequency itself suffers from rapid attenuation due to propagation characteristics, and highly directional beams suppress interference to undesired directions. Therefore, it is unnecessary to use a centralized critic that needs to be trained over the entire set of base stations. More generally, the formulation may provide a flexible trade-off between inter-base station information exchange and how accurately the overall radio environment can be perceived by each agent. Two special cases may be considered in this disclosure. When no information exchange is allowed among agents, i.e., $N_i=\emptyset$, $\forall$i, expression (15) becomes $$Q_i(o_j, a_j \mid \theta_i^Q), \tag{16}$$

which is the case of independent learning. In contrast, if information exchange is allowed among arbitrary agents, i.e., $N_i=\{1, \ldots, K\}\backslash\{i\}$, $\forall$i, expression (15) becomes $$Q_i\left((o_j)_{j=1}^{K}, (o_j)_{j=1}^{K} \mid \theta_i^Q\right), \tag{17}$$

which is equivalent to the original MADDPG critic. It is noted that the notation "\{i}" indicates that the i-th agent is excluded and thus $N_i$ is a set of neighboring agents except the i-th agent. In an aspect, with the neighboring set $\hat{N}_t$, which include $N_i$ and the i-th agent, a separate replay buffer $D_i$ may be defined for the i-th agent and store the experiences in the form of $$\left((o_j)_{j\in\hat{N}_i}, (a_j)_{j\in\hat{N}_i}, (r_j)_{j\in\hat{N}_i}, (o'_j)_{j\in\hat{N}_i}\right), \forall\ i. \tag{18}$$

Actions, local observations, and rewards in the multi-agent deep reinforcement learning-enabled distributed scheme may be designed and described below. With regard to actions, each base station may need to determine the transmit power $$p_i^{(t)} \in [0, p_i^{max}]$$

to its scheduled user device at the beginning of each slot. Since the Tanh activation may be used for the output layer of the actor networks 210, the actor output $$a_i^{(t)} = \mu_i(o_i^{(t)} \mid \theta_i^{\mu})$$

falls into a range of [−1, 1]. The Tanh activation may be defined as the tangent hyperbolic tangent function or by the following expression.

$$\frac{e^x - e^{-x}}{e^x + e^{-x}}. \tag{19}$$

To achieve exploration, a random noise $N_t$ may be added to $$a_i^{(t)},$$

which is then clipped to the range [−w, w] for w∈(0, 1). Since the hyperbolic tangent function requires an infinitely large input to achieve the output values±1, clipping to [−w, w] where 0<w<1 increases numerical stability of the DNN training. Therefore, the actor output is mapped to the powers according to the following expression:

$$p_i^{(t)} = \frac{a_i^{(t)} + w}{2w} p_i^{max}. \tag{20}$$

The local observation may represent each agent's (partial) perception of the radio environment. The local observation may have to capture the environment features that are relevant to the agent's decision making. To control complexity and make the scheme scalable, the information exchange is limited to neighboring base stations. In this regard, the distributed execution module 250 may gather local observations, including data on previous power levels, channel gains, interference measurements, and throughput data from neighboring base stations. In particular, the observation $$o_i^{(t)}$$

of the i-th agent may be defined as $$o_i^{(t)} \triangleq \left\{ \begin{array}{c} p_i^{(t-1)}, g_{ii}^{(t-1)}, g_{ii}^{(t)} I_i^{(t-1)}, \hat{I}_i^{(t)}, C_i^{(t-1)}, \dfrac{c_i^{(t-1)}}{\sum_{j\in\hat{N}_i} c_j^{(t-1)}}, \\ g_{ij}^{(t-1)} p_j^{(t-1)}, g_{ij}^{(t)} p_j^{(t)}, C_j^{(t-1)}, \forall\ j \in N_i \end{array} \right\}, \tag{21}$$

which includes several interference and channel measurements at the i-th base station and throughput obtained from neighboring base stations. In particular, $$p_i^{(t-1)}$$

is the power of the i-th base station in the previous slot, $$g_{ii}^{(t-1)}$$

is the direct channel gain between the i-th base station and its scheduled user device in slot t−1[2], and is defined by $$g_{ii}^{(t-1)} = PL(d_{ii}) G_{ii} \left|h_{ii}^{(t-1)}\right|^2.$$

Direct channel gain $$g_{ii}^{(t)}$$

is the direct channel gain in slot (t) and is defined by $$g_{ii}^{(t)} = PL(d_{ii}) G_{ii} \left|h_{ii}^{(t)}\right|^2.$$

The direct channel gains may be estimated via pilot training. It is assumed that the channel changes from $$h_{ii}^{(t-1)} \text{ to } h_{ii}^{(t)}$$

at the very beginning of slot (t) and right before the new powers $$p_i^{(t)} \forall i$$

are determined, $$g_{ii}^{(t)}$$

may also be used by the i-th base station. The total interference (plus noise), $$I_i^{(t-1)},$$

measured at the i-th base station in slot (t−1) may be defined as $$I_i^{(c-1)} = \sum_{j \neq i} g_{ij}^{(t-1)} p_j^{(t-1)} + \sigma^2. \quad (22)$$

Likewise, the total interference, $\widehat{I_\iota^{(t)}}$, measured at the beginning of slot (t) where the channels have changed but the powers have not been updated may be defined as $$\widehat{I_i^{(t)}} = \sum_{j \neq i} g_{ij}^{(t)} p_j^{(t-1)} + \sigma^2. \quad (23)$$

$$C_i^{(t-1)}$$

is the throughput of the i-th base station at the previous slot (t−1), and $$\frac{c_i^{(t-1)}}{\sum_{j \in \widetilde{N}_\iota} c_j^{(t-1)}}$$

represents the relative importance of the i-th base station in terms of throughput contribution among its neighboring base stations. Moreover, $$g_{ij}^{(t-1)} p_j^{(t-1)}$$

and $$g_{ij}^{(t)} p_j^{(t)}$$

are the measured interferences from the j-th base station $\in N_i$ in slot (t−1) and the beginning of slot (t), respectively. Finally, $$C_j^{(t-1)}$$

represents the throughput achieved by The j-th base station in the previous slot. It is noted that $$C_j^{(t-1)}$$

has to be delivered from the j-th base station to the i-th base station despite all other interference measurements can be directly obtained at the i-th base station. One or more previous slots may be included in order for the agents to better keep track of the time-varying channels.

With regard the rewards, unlike other methods which rely on a heuristic reward design, a centralized reward, i.e., $$r_i^{(t)} = \sum_{j=1}^{K} C_j^{(t)}, \forall i,$$

which is intuitive and computationally efficient, may be employed.

With the above definitions, the power allocation scheme may be summarized as follows. At the beginning of slot (t), the i-th base station conducts the interference measurements and exchanges throughput of the previous slot with its neighboring base stations in order to construct its local observation $$o_i^{(t)}.$$

The i-th base station may choose an action, $$a_i^{(t)} = \mu_i(o_i^{(t)} | \theta_i^{\mu}) + N_t,$$

which is then mapped to the actual power $$p_i^{(t)} = \frac{a_i^{(t)} + w}{2w} p_i^{max}.$$

The chosen power may be used for one slot until the next slot begins and the new observation $$o_i^{(t+1)}$$

can be obtained. The experience of the i-th agent, ($(o_j)_{j \in \widetilde{N}_\iota}, (a_j)_{j \in \widetilde{N}_\iota}, (r_j)_{j \in \widetilde{N}_\iota}, (o'_j)_{j \in \widetilde{N}_\iota}$), may be then pushed to the corresponding replay buffer $D_i$. For every $T_{train}$ slots, the actor network 210 and the critic network 220 may be trained using the mini-batch stochastic gradient descent (SGD) method according to expressions (10) and (12) by the centralized training module 240.

With regard to the complexity, the input sizes of the actor and critic networks 210 and 220 may be $$|o_i^{(t)}| = 3N + 7 \text{ and } (N+1)|o_i^{(t)}| = (N+1)(3N+7),$$

respectively, where $N=|N_i|$, which is the size of the neighboring agents of the i-th agent. These input sizes may not scale with K if N is fixed.

For example with N=6, the actor network 210 and critic network 220 may contain about 30k and 55k parameters, respectively. Due to the local observation design of expression (21), each base station needs to send its throughput in the previous slot to its neighboring base stations. This incurs a communication overhead O(N) per base station, thereby reducing the communication overhead. Thus, regardless of the number of base stations (e.g., the base stations 110*a*-110*n*) in a wireless network (e.g., the wireless network 100 of FIG. 1) and regardless of the number of user devices associated with each base station, each base station may be able to independently determine the current transmit power and train the actor network 210 and the critic network 220 based on the data from neighboring base stations and not from all the base stations.

Figure 4A:
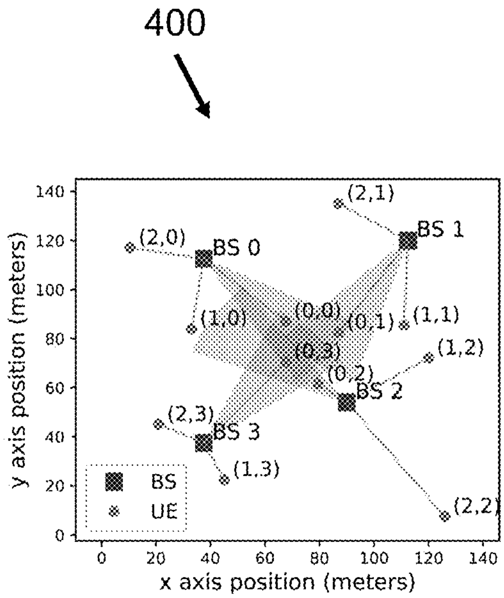
FIG. 4A is a network graph of an overlapped beam configuration in accordance with various aspects of the present disclosure.
Figure 4B:
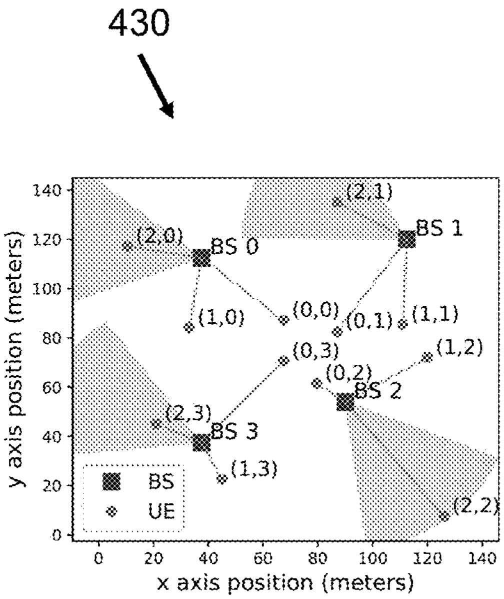
FIG. 4B is a network graph of a wide or weak beams configuration in accordance with various aspects of the present disclosure.
Figure 4C:
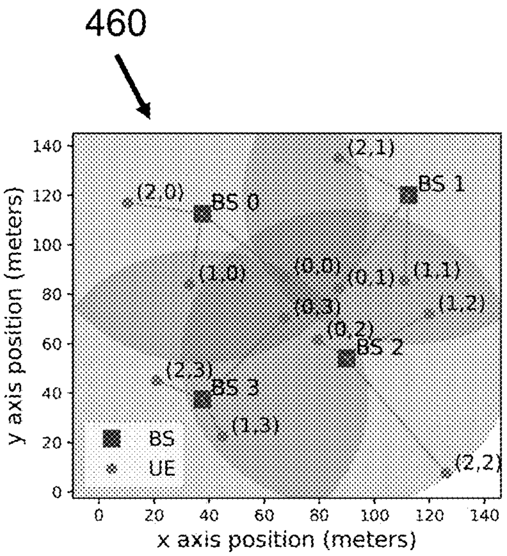
FIG. 4C is a network graph of an omnidirectional or no beam configuration in accordance with various aspects of the present disclosure.

Now turning to FIGS. 4A-4C, illustrated are various wireless communication configurations based on signal beam overlapping, according to various aspects of the present disclosure. Particularly, FIG. 4A illustrates a configuration where the set of scheduled user devices are located at the cell edge and experience strong interference due to the beam overlapping. The antenna main-to-sidelobe ratio (MSR) and beamwidth are set to be 10 dB and 30°, respectively. FIG. 4B illustrates a configuration where sparsely distributed wide beams with relatively low power concentration. The antenna MSR and beamwidth are set to be 3 dB and 60° beams with scheduled user devices, respectively. FIG. 4C illustrates a configuration with no beams. Specifically, FIG. 4C shows the configuration where base station antennas are omnidirectional. The vertical and horizontal axes of FIGS. 4A-4C represent positions in the X-Y plane in unit of meters.

To verify advancement of throughput and computational efficiencies of the multi-agent deep reinforcement learning-enabled distributed scheme, simulations have been performed with other conventional approaches including FP, weighted minimum mean square error (WMMSE), random, and full reuse approaches. Simulation setup may consider a wireless network with 4 base stations under various beam and user device configurations as shown in FIGS. 4A-4C. Four base stations BS0-BS4 are located at the same places in the configurations, and user devices are also located at the same places in the configurations. Each base station is associated with three user devices where user device (j, i) denotes the j-th user device of the i-th base station. Antenna beams are aligned with the scheduled user devices.

The parameters used in the simulation are summarized in Table I.

TABLE I

| Simulation Parameters | |
|---|---|
| Parameters | Value |
| $p_i^{max}$, ∀ i | 39 dBm |
| Bandwidth W | 400 MHZ |
| Path loss | $a_0 = 2$, $a_1 = 4$, $d_c = 26$ m |

TABLE I-continued

| Simulation Parameters | |
|---|---|
| Parameters | Value |
| Fading | M = 50, Ω = 2, ρ = 0.5 |
| DNN optimizer | Adam |
| Learning rates | $10^{-4}$ (actor), $10^{-3}$ (critic) |
| Replay Buffer Size | $5 \times 10^5$ |
| Batch Size | 128 |
| γ, τ | 0.9, $5 \times 10^5$ |

The total noise power is calculated according to $\sigma^2$ (dBm)=10 log($\kappa_B T_0 \times 10^3$)+NR(dB)+10 log W, with $\kappa_B$, NR, and $T_0$ being Boltzmann's constant, receiver noise figure, and temperature, respectively. Taking the typical values of NR=1.5 dB, $T_0$=290 K, $\sigma^2$ is calculated to be −86.46 dBm. The scheme may be implemented with PyTorch. Each actor or critic network is represented by a fully-connected DNN with 5 layers including 3 hidden layers each containing 200, 100, and 50 neurons, respectively. The numbers of layers and hidden layers of the DNN are provided as an example and may be greater or less than 5 and 3, respectively. Further, the number of neurons is also provided as an example, and may be greater or less than 200, 100, or 50.

In these configurations, each actor network of the base stations may have one output port with the Tanh activation clipped to the range [−0.95, +0.95] based on the magnitude of the noise. Each critic network of the base stations may also have one output port activated with the rectified linear unit (ReLU) activation function, which outputs a non-negative value regardless of a value of the input.

Figure 5A:
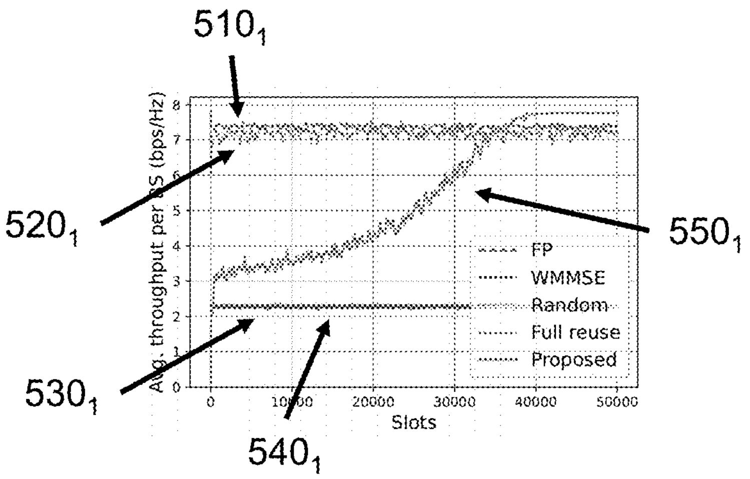
FIG. 5A data plots of throughput training performance for the configuration of FIG. 4A in accordance with various aspects of the present disclosure.

With the simulation parameters and the wireless communication configuration of FIG. 4A, FIG. 5A illustrates average throughputs per base station in bps/Hz based on different optimization approaches including fractional programming (FP), weighted minimum mean square error (WMMSE), random, full reuse, and multi-agent deep reinforcement learning-enabled distributed schemes.

The FP scheme is an optimization technique used to solve the power allocation problem by maximizing the throughput while considering the interference among base stations. The objective function may maximize $$\sum_i \frac{\text{Throughput}_i}{\text{Interference}_i + \text{Noise}}$$

subject to: $P_i \le P^{max}$ ∀i, where $P_i$ is the transmit power of base station i, and $P^{max}$ is the maximum allowable transmit power. The WMMSE scheme is another optimization technique used to solve the power allocation problem by minimizing the mean square error (MSE) to improve overall network performance. Both are centralized algorithms with superior performance which is hard to be outperformed in general. For example, several learning-based methods have been shown to approximate their performance. However, the performance of WMMSE and FP depends on heuristic parameter initialization whose impact is unclear. It is assumed that the required channel state information (CSI) can be obtained with no delay at the beginning of each slot.

The random scheme utilizes randomness to enhance exploration, initialization, and the robustness of the algorithms, and the full reuse scheme simultaneously uses the entire frequency spectrum of all base stations without any dedicated frequency bands. This approach aims to maximize spectral efficiency and are provided as additional baselines for comparison purposes.

Figure 5B:
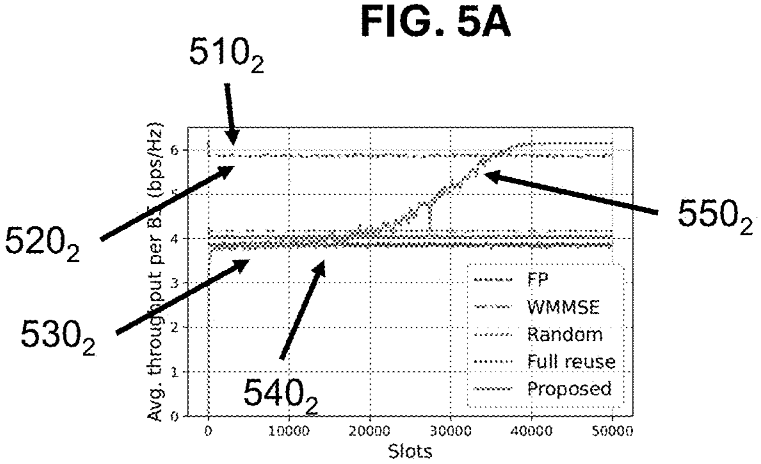
FIG. 5B is data plots of throughput training performance for the configuration of FIG. 4B in accordance with various aspects of the present disclosure.
Figure 5C:
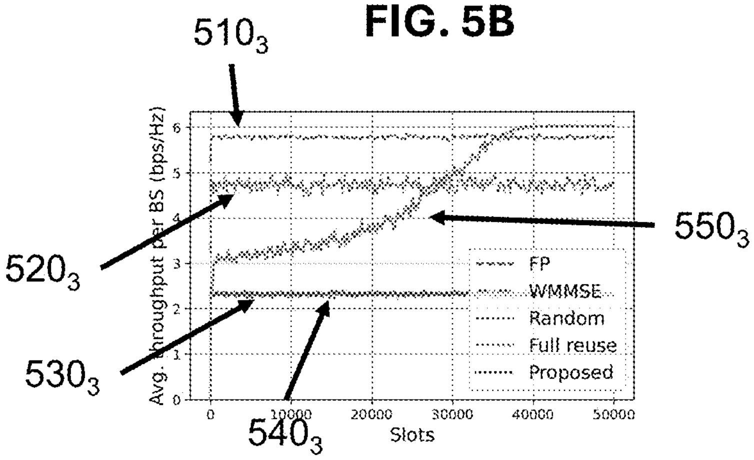
FIG. 5C is data plots of throughput training performance for the configuration of FIG. 4C in accordance with various aspects of the present disclosure.

Data plots 510-550 of FIGS. 5A-5C show throughputs of the FP, WMMSE, random, full reuse, and multi-agent deep reinforcement learning-enabled distributed schemes, respectively. The horizontal and vertical axes of FIGS. 5A-5C represent time slots and average throughput per base station in bps/Hz. Subscripts of data plots 510-550 indicates the wireless communication configurations of FIGS. 4A-4C. For example, data plot $\mathbf{510}_1$ shows throughput of the FP scheme based on the wireless configuration of FIG. 4A, and data plot $\mathbf{550}_2$ shows throughput of the multi-agent deep reinforcement learning-enabled distributed schemes based on the wireless communication configuration of FIG. 4B. Each data point on the data plots $\mathbf{510}_1$-$\mathbf{550}_3$ represents an average of the previous 100 slots.

Based on the data plots $\mathbf{510}_1$-$\mathbf{510}_3$ and $\mathbf{520}_1$-$\mathbf{520}_3$, the average throughputs by the FP and WMMSE schemes are substantially constant along the passage of time slots. Similarly, based on the data plots $\mathbf{530}_1$-$\mathbf{530}_3$ and $\mathbf{540}_1$-$\mathbf{540}_3$, the average throughputs by the random and full reuse schemes are substantially constant along the passage of time slots. However, the average throughputs by the FP and WMMSE schemes are generally greater than the average throughputs by the random and full reuse schemes.

On the other hand, based on the data plots $\mathbf{550}_1$-$\mathbf{550}_3$, the multi-agent deep reinforcement learning-enabled distributed scheme is illustrated as converging in roughly 40,000 slots and achieving slightly higher throughputs than the FP and WMMSE schemes and substantially higher throughputs than the random and full reuse schemes.

Figure 6:
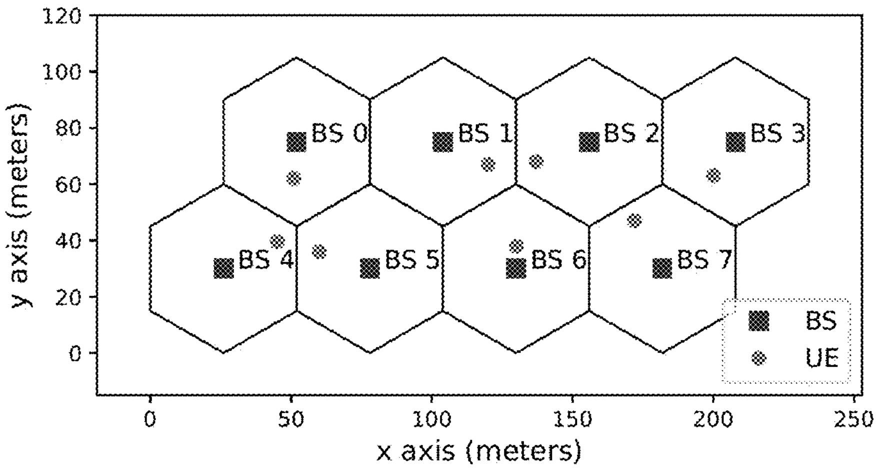
FIG. 6 is a wireless network configuration with base stations in accordance with various aspects of the present disclosure.

Now turning to FIG. 6, illustrated is a more robust wireless communication configuration 600 than the configurations illustrated in FIGS. 4A-4C according to various aspects of the present disclosure. Each base station is illustrated as a rectangular box and each user device is illustrated as a circular dot. The horizontal and vertical axes represent distances in unit of meters. Neighboring base stations of each base station may be limited to be $|N_i|\leq 6$, $\forall i$ as in a hexagon cell grid, and each base station may have at most six other neighboring base stations based on the hexagon cell grid. In a case where the number of neighboring base stations for a base station is less than six, $6-|N_i|$ dummy base stations may be created to serve as virtual neighboring base stations with zero transmit power to ensure a fixed input size of the DNNs. In the configuration 600, the antenna main-to-sidelobe ratio (MSR) and beamwidth may be configured as 20 dB and 45°.

To further ensure adequate exploration, the action noise $\{N_t, \forall t\}$ may be chosen as a Gaussian noise with a decreasing variance, i.e., $$N_t \sim N(0, \sigma_t^2),$$

where $\sigma_{t+1}=\max\{(1-\varepsilon)\sigma_t, \sigma_{min}\}$ with $\varepsilon=10^{-4}$, $\sigma_0=1$, and $\sigma_{min}=0.01$. The actor and critic networks may be trained every $T_{train}=5$ slots. There are two phases: the training phase (50,000 slots) where the actor and critic networks may be trained periodically while interacting with the environment, and the testing phase (1,000 slots) in which the trained actor networks may be used to select powers without learning. Further, the inputs of the actor and critic networks may be normalized to stabilize the training. Hence, each interference measurement $I_i$ at the i-th base station in expression (21) may be scaled to [0, 1] via the following expression:

$$I_i' = \frac{I_i - I_i^{min}}{I_i^{max} - I_i^{min}}, \tag{24}$$

where $$I_i^{max}$$

and $$I_i^{min}$$

are the maximum and minimum possible interference at the i-th base station, respectively. In a case where $$I_i^{min}$$

is set to be zero, $$I_i^{max}$$

may be estimated by letting all base stations transmit with maximum powers and observing the interference.

Figure 7A:
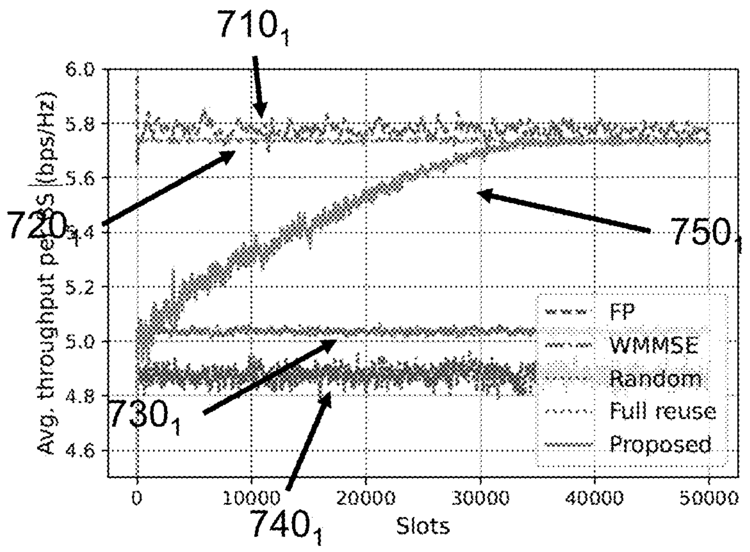
FIG. 7A is data plots of training performance over the general topology in accordance with various aspects of the present disclosure.
Figure 7B:
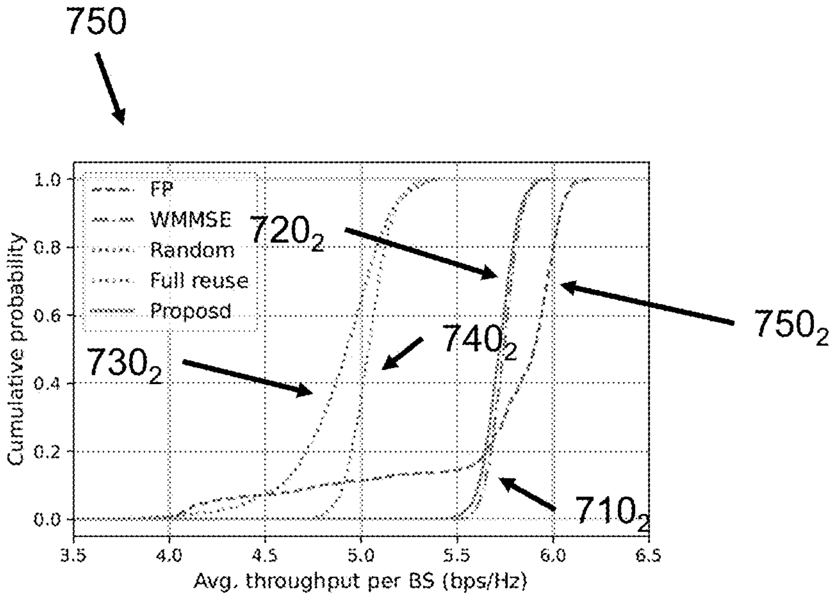
FIG. 7B is data plots of empirical cumulative density function of testing over the general topology in accordance with various aspects of the present disclosure.

FIGS. 7A and 7B illustrate results corresponding to the configuration of FIG. 6. Specifically, FIG. 7A illustrates data plots $\mathbf{710}_1$-$\mathbf{750}_1$ of training performance and FIG. 7B illustrates data plots $\mathbf{710}_2$-$\mathbf{750}_2$ of empirical cumulative density function (CDF) of testing in accordance with various aspects of the present disclosure. The horizontal and vertical axes of FIG. 7A represent slots and average throughput per base station in bps/Hz, respectively, and the horizontal and vertical axes of FIG. 7B represent average throughput per base station in bps/Hz and cumulative probability, respectively.

During training phase and based on the data plots $\mathbf{710}_1$-$\mathbf{750}_1$ illustrated in FIG. 7A, the average throughput of the configuration 600 converges to a value close to 5/0.8 bps/Hz in roughly 32,000 slots (see data plot $\mathbf{750}_5$) and achieves similar performance to WMMSE (see data plot $\mathbf{710}_2$) and FP (see data plot $\mathbf{710}_1$). This may demonstrate the scalability of the configuration 600. The learned policy may be tested for 1,000 slots over another randomly generated channel realization with a smaller correlation of $\rho=0.1$. The exploration noise may be removed during the testing phase.

The empirical CDF of the average throughput during the testing phase is illustrated as data plots $\mathbf{710}_2$-$\mathbf{750}_2$. The throughputs of the random and full reuse schemes are shown in the data plot $\mathbf{730}_2$ and $\mathbf{740}_2$, respectively, and are much less than the throughput of the configuration 600 according to the data plot $\mathbf{750}_2$. Although the channels are less correlated and harder to be tracked, the learned policy still maintains a very close performance to WMMSE according to the data plot $\mathbf{720}_2$. FP achieves higher throughput according to the data plot $\mathbf{710}_2$ than the throughput of the configuration 600 according to the data plot $\mathbf{750}_2$ but has a less concentrated distribution than the configuration 600. Thus, the configuration 600 may demonstrate generalization ability.

Figure 8:
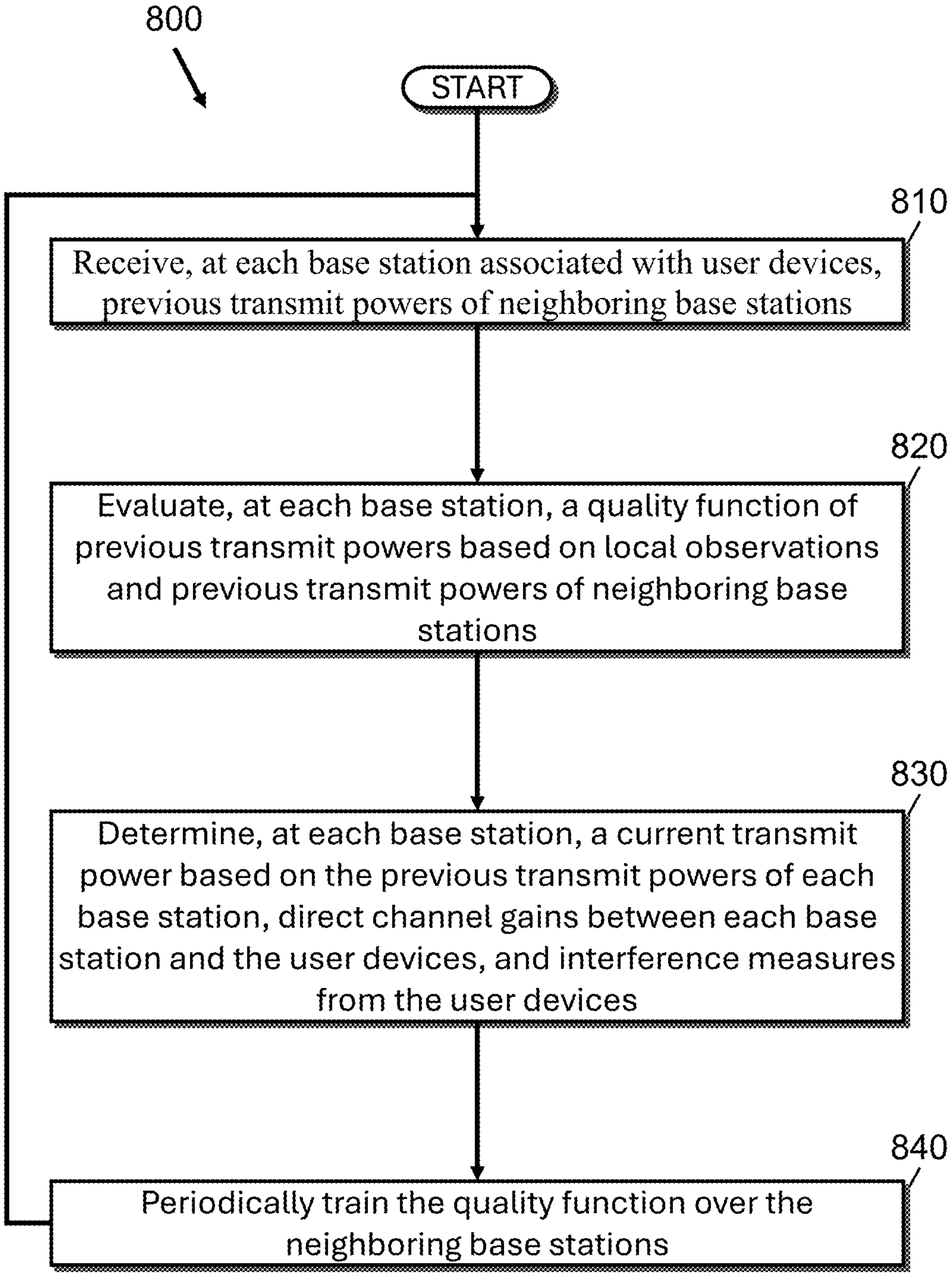
FIG. 8 is a flowchart for allocating power to a plurality of base stations in a wireless network in accordance with various aspects of the present disclosure.

Turning now to FIG. 8, illustrated is a flowchart of a method 800 for allocating power to a plurality of base stations in a wireless network in accordance with various aspects of the present disclosure. It is assumed that the wireless network includes multiple base stations, which transmit power to or are associated with multiple user devices. The method 800 may distribute power allocation using multi-agent deep reinforcement learning. The method 800 may employs a centralized-training-distributed-execution framework where Q-functions are trained over subsets of base stations while each base station determines its transmit power based only on its own local observation.

The method 800 may include step 810, in which each base station associated with user devices receives previous transmit powers of neighboring base stations, which are a subset of all the base stations in the wireless network. The neighboring base stations may be selected based on the impact on each base station. In an aspect, if one base station does not have any significant impact on each base station, the one base station may not be selected as a neighboring base station. In another aspect, the neighboring base station may be selected based on the distance from each base station.

The method 800 may further include step 820, in which each base station evaluates a quality function of previous transmit powers based on local observations and previous transmit powers of neighboring base stations. The quality function may be defined as the expected return (e.g., expression (9)) starting from any state-action pair. Each base station may include a critic network configured to evaluate the quality function. The local observation may represent each base station's (partial) perception of the radio environment. The local observation may have to capture the environment features that are relevant to the base station's decision making. To control complexity and make the scheme scalable, the information exchange is limited to neighboring base stations. The local observation may include data on previous transmit power levels, channel gains, interference measurements, and throughput data from neighboring base stations. The local observation may be defined as in expression (21).

The method may further include step 830, in which each base station determine a current transmit power based on the previous transmit powers of each base station, direct channel gains between each base station and the user devices, and interference measures from the user devices. The direct channel gains may be defined as in expression (3). The interference measures may be the total interference of each base station and defined as in expression (22) or (23). The current transmit power may be determined based on expression (20).

The current transmit power may be independently mapped for each base station based on training using multi-agent deep reinforcement learning. In this regard, the method 800 may further include step 840, in which each base station periodically trains the quality function over the neighboring base stations. For example, the centralized training module 240 of FIG. 2 may train the quality functions of the critic networks using data from the neighboring base stations. The training may be performed by deep neural network (DNN) based actor/critic training. Since data is obtained not from all base stations, the method 800 can suppress unnecessary information exchanges among base stations and increase the stability and training efficiency of the DNN-based actor/critic training by restricting the input of the DNNs to a relatively small or manageable size.

Figure 2:
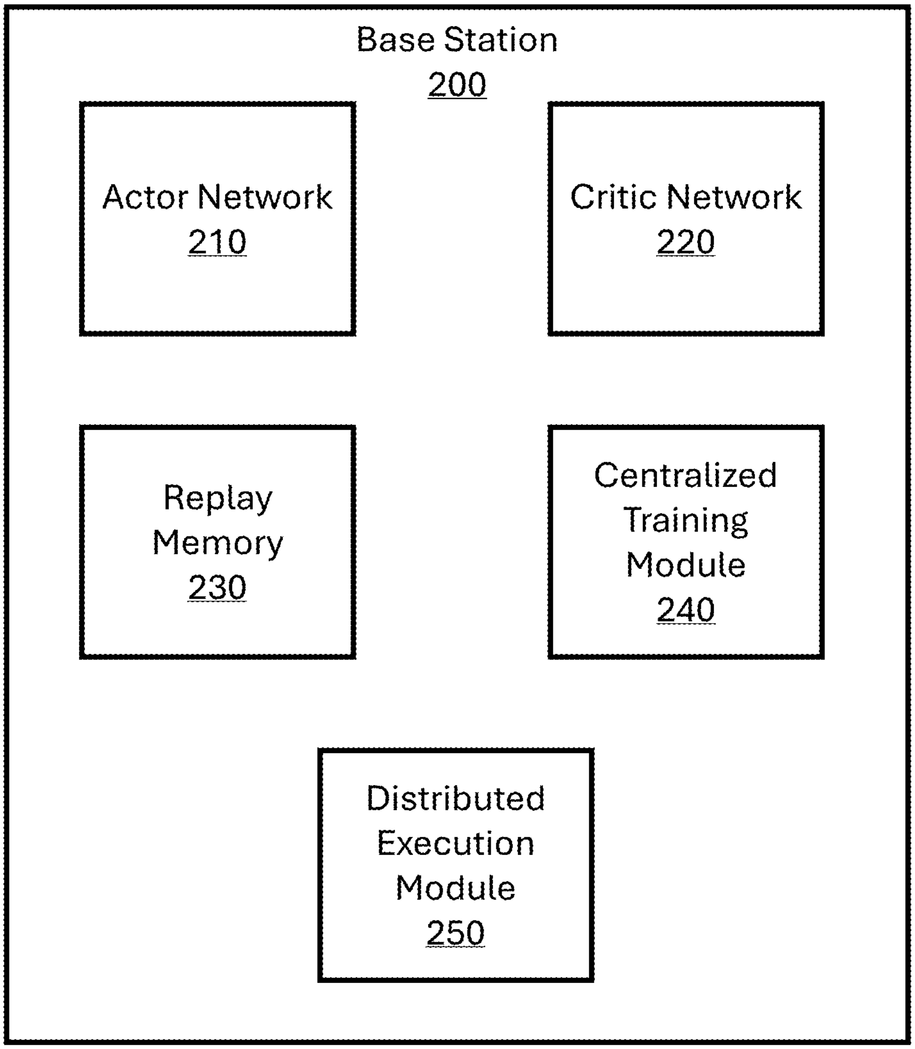
FIG. 2 is a block diagram of a base station in the wireless communication network of FIG. 1 in accordance with various aspects of the present disclosure.
Figure 9:
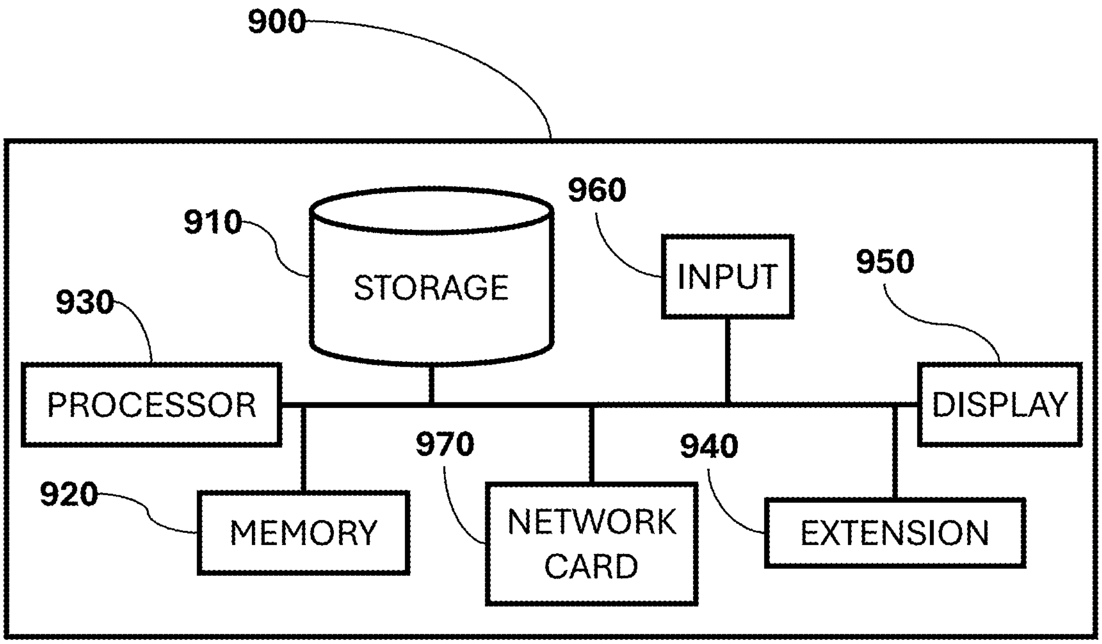
FIG. 9 is a block diagram for a computing device in accordance with various aspects of the present disclosure.

Attention will now be directed to FIG. 9 which illustrates a computing device 900 representative of a computing device, which can implement the functions of the base station 200 of FIG. 2. The computing device 900 may include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, network consoles, embedded computers, or other devices capable of performing calculations/operations. Persons of skill in the art will recognize that many smart devices are suitable for use in the system described herein. Suitable tablet computers include those with booklet, slate, and convertible configurations, known to those of skill in the art.

The computing device 900 includes an operating system configured to perform executable instructions. The operating system is, for example, software, including programs and data, which manages the device's hardware and provides services for execution of applications. Those of skill in the art will recognize that suitable server operating systems include, by way of non-limiting examples, Freebase stationD, Openbase stationD, Netbase stationD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some aspects, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In various aspects, the computing device 900 may include a storage 910. The storage 910 is one or more physical apparatus used to store data or programs on a temporary or permanent basis. In some aspects, the storage 910 may be volatile memory and requires power to maintain stored information. In aspects, the storage 910 may be non-volatile memory and retains stored information when the computing device 900 is not powered. In aspects, the non-volatile memory includes flash memory. In aspects, the non-volatile memory includes dynamic random-access memory (DRAM). In aspects, the non-volatile memory includes ferroelectric random-access memory (FRAM). In aspects, the non-volatile memory includes phase-change random access memory (PRAM). In aspects, the storage 910 includes, by way of non-limiting examples, CD-ROMs, DVDs, flash memory devices, magnetic disk drives, magnetic tapes drives, optical disk drives, and cloud computing-based storage. In aspects, the storage 910 may be a combination of devices such as those disclosed herein.

The storage 910 includes executable instructions (i.e., codes). The executable instructions represent instructions that are executable by the processor 905 of the computing device 900 to perform the disclosed operations, such as those described in the various methods. Furthermore, the storage 910 excludes signals, carrier waves, and propagating signals. On the other hand, the storage 910 that carry computer-executable instructions may be "transmission media" and include signals, carrier waves, and propagating signals. Thus, by way of example and not limitation, the current aspects may include at least two distinctly different kinds of computer-readable media: computer storage media and transmission media.

The computing device 900 further includes a processor 930, an extension 940, a display 950, an input device 960, and a network card 970. The processor 930 is a brain to the computing device 900. The processor 930 executes instructions which implement tasks or functions of programs. When a user executes a program, the processor 930 reads the program stored in the storage 910, loads the program on the RAM, and executes instructions prescribed by the program.

The processor 930 may include, without limitation, Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware by performing the basic arithmetic, logical, control and input/output (I/O) operations specified by the instructions. As used herein, terms such as "executable module," "executable component," "component," "module," or "engine" may refer to the processor 930 or to software objects, routines, or methods that may be executed by the processor 930 of the computing device 900. The different components, modules, engines, and services described herein may be implemented as objects or the processor 930 that execute on the computing device 900 (e.g., as separate threads).

In aspects, the extension 940 may include several ports, such as one or more universal serial buses (USBs), IEEE 1394 ports, parallel ports, and/or expansion slots such as peripheral component interconnect (PCI) and PCI express (PCIe). The extension 940 is not limited to the list but may include other slots or ports that may be used for appropriate purposes. The extension 940 may be used to install hardware or add additional functionalities to a computer that may facilitate the purposes of the computer. For example, a USB port may be used for adding additional storage to the computer and/or an IEEE 1394 may be used for receiving moving/still image data.

In some aspects, the display 950 may be a cathode ray tube (CRT), a liquid crystal display (LCD), or light emitting diode (LED). In some aspects, the display 950 may be a thin film transistor liquid crystal display (TFT-LCD). In some aspects, the display 950 may be an organic light emitting diode (OLED) display. In various some aspects, the OLED display is a passive-matrix OLED (PMOLED) or active-matrix OLED (AMOLED) display. In some aspects, the display 950 may be a plasma display. In some aspects, the display 950 may be a video projector. In some aspects, the display may be interactive (e.g., having a touch screen or a sensor such as a camera, a 3D sensor, a LiDAR, a radar, etc.) that may detect user interactions/gestures/responses and the like.

A user may input and/or modify data via the input device 960 that may include a keyboard, a mouse, or any other device with which the use may input data. The display 950 displays data on a screen of the display 950. The display 950 may be a touch screen so that the display 950 may be used as an input device.

The network card 970 is used to communicate with other computing devices, wirelessly or via a wired connection. Through the network card 970, one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computing device 900 may include one or more communication channels that are used to communicate with the network card 970. Data or desired program codes are carried or transmitted in the form of computer-executable instructions or in the form of data structures vi the network card 970.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembly, Basic, Batch files, BCPL, C, C+, C++, C #, Delphi, Fortran, Java, JavaScript, machine code, operating system command languages, Pascal, Perl, PL1, scripting languages, Visual Basic, meta-languages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The aspects disclosed herein are examples of the disclosure and may be embodied in various forms. Although certain aspects herein are described as separate aspects, each of the aspects herein may be combined with one or more of the other aspects herein. It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

The present disclosure may be embodied in other specific forms without departing from its characteristics. The described aspects are to be considered in all respects only as illustrative and not restrictive. The scope of the present disclosure is, therefore, indicated by the appended claims rather than by the foregoing description. All changes which come within the meaning and range of equivalency of the claims are to be embraced within their scope.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A base station associated with user devices in a wireless network, which includes a plurality of base stations, the base station comprising:

a processor; and a memory including instructions that, when executed by the processor, cause the base station to function as:

an actor network configured to determine a current transmit power;

a critic network configured to evaluate a quality function of previous transmit powers of the base station based on local observations and previous transmit powers of neighboring base stations; and a decentralized training unit configured to train the quality function over the neighboring base stations, wherein the neighboring base stations are a subset of the plurality of base stations, and wherein the current transmit power is determined based on the previous transmit powers of the base station, direct channel gains between the base station and the user devices, and interference measures from the user devices.

2. The base station according to claim 1, wherein the local observations include the previous transmit powers, direct channel gains, the interference measures, and throughput data from the neighboring base stations.

3. The base station according to claim 2, wherein the interference measures are obtained from user devices associated with the base station and from the neighboring base stations.

4. The base station according to claim 1, wherein the power transmitted by the base station is activated by a hyperbolic tangent function.

5. The base station according to claim 1, wherein the power transmitted by the base station is clipped by a noise.

6. The base station according to claim 1, wherein the neighboring Base stations are selected based on a distance from the base station.

7. The base station according to claim 1, further comprising:

a buffer configured to store experiences including previous observations, actions, rewards, and next observations for training the actor network and the critic network.

8. The base station according to claim 7, wherein the critic network is trained using mini-batch stochastic gradient descent with data sampled from the buffer.

9. The base station according to claim 1, wherein the instructions, when executed by the processor, cause the base station to further function as:

a centralized training unit configured to periodically train the critic network using data from the neighboring base stations.

10. The base station according to claim 1, wherein the current transmit power is clipped to a predefined range to ensure numerical stability.

11. A system for allocating power in a wireless network, the system comprising:

a plurality of base stations, each base station being configured to autonomously determine a transmit power based on local observations and being associated with user devices, wherein each base station comprises:

a processor; and a memory including instructions that, when executed by the processor, cause each base station to function as:

an actor network configured to determine a current transmit power;

a critic network configured to evaluate a quality function of previous transmit powers of the base station based on local observations and previous transmit powers of neighboring base stations; and a decentralized training unit configured to train the quality function over the neighboring base stations, wherein the neighboring base stations are a subset of the plurality of base stations, and wherein the current transmit power is determined based on the previous transmit powers of each base station, direct channel gains between each base station and the user devices, and interference measures from the user devices.

12. The system according to claim 11, wherein the local observations include the previous transmit powers, direct channel gains, the interference measures, and throughput data from the neighboring base stations.

13. The system according to claim 12, wherein the interference measures are obtained from user devices associated with each base station and from the neighboring base stations.

14. The system according to claim 11, wherein the power transmitted by each base station is activated by a hyperbolic tangent function.

15. The system according to claim 11, wherein the power transmitted by each base station is clipped by a noise.

16. The system according to claim 11, wherein the neighboring Base stations are selected based on a distance from the base station.

17. The system according to claim 11, wherein each base station further comprises:

a buffer configured to store experiences including previous observations, actions, rewards, and next observations for training the actor network and the critic network.

18. The system according to claim 17, wherein the critic network is trained using mini-batch stochastic gradient descent with data sampled from the buffer.

19. The system according to claim 11, wherein the instructions, when executed by the processor, cause each base station to further function as:

a centralized training unit configured to periodically train the critic network using data from the neighboring base stations.

20. A method for allocating power to a plurality of base stations in a wireless network, the method comprising:

receiving, at each base station associated with user devices, previous transmit powers of neighboring base stations;

evaluating, at each base station, a quality function of previous transmit powers of the base station based on local observations and previous transmit powers of neighboring base stations;

determining, at each base station, a current transmit power based on the previous transmit powers of each base station, direct channel gains between each base station and the user devices, and interference measures from the user devices; and training the quality function over the neighboring base stations.

* * * * *